United States Patent [19]
Taylor et al.

[11] 3,934,129
[45] Jan. 20, 1976

[54] APPARENT WIND DIRECTION INDICATOR

[75] Inventors: Lucian W. Taylor, Los Altos; George J. Eilers, Redwood City, both of Calif.

[73] Assignee: Velcon Filters, Inc., San Jose, Calif.

[22] Filed: Aug. 21, 1974

[21] Appl. No.: 499,253

Related U.S. Application Data

[62] Division of Ser. No. 347,380, April 3, 1973, Pat. No. 3,881,095.

[52] U.S. Cl. .......... 235/151.34; 73/188; 235/151.3; 235/183
[51] Int. Cl.² ...................... G01P 13/02; G06G 7/18
[58] Field of Search............ 235/151.3, 183, 151.34; 318/654, 655; 340/198; 73/188

[56] References Cited
UNITED STATES PATENTS

| | | | |
|---|---|---|---|
| 2,414,919 | 1/1947 | Alexanderson | 318/655 |
| 2,415,080 | 2/1947 | Bonell | 318/655 |
| 2,970,302 | 1/1961 | Gridley | 340/198 |
| 3,323,130 | 5/1967 | Bailey | 73/188 |
| 3,552,206 | 1/1971 | Lauter, Jr. | 73/188 |
| 3,665,759 | 5/1972 | Daley | 73/188 |
| 3,727,457 | 4/1973 | Gregory | 73/188 |

OTHER PUBLICATIONS

Howbrook: A New Synchro. Conference on Servocomponents, Nov. 21–23, 1967, IEE Control and Automation Division, London, pp. 7-12.

*Primary Examiner*—Felix D. Gruber
*Attorney, Agent, or Firm*—David H. Wilson

[57] ABSTRACT

A system for evaluating the performance of a sailing boat wherein average boat speed, average apparent wind speed and average apparent wind direction are sensed and are utilized to determine the performance characteristics of sailing boats. The system includes an apparent wind direction indicator which senses the instantaneous apparent wind direction and compares it with a previously generated average apparent wind direction signal to obtain an error signal. The error signal is intergrated to obtain an average error signal which is utilized to correct the previously generated average apparent wind direction signal by changing the position of an average apparent wind direction indicator.

14 Claims, 7 Drawing Figures

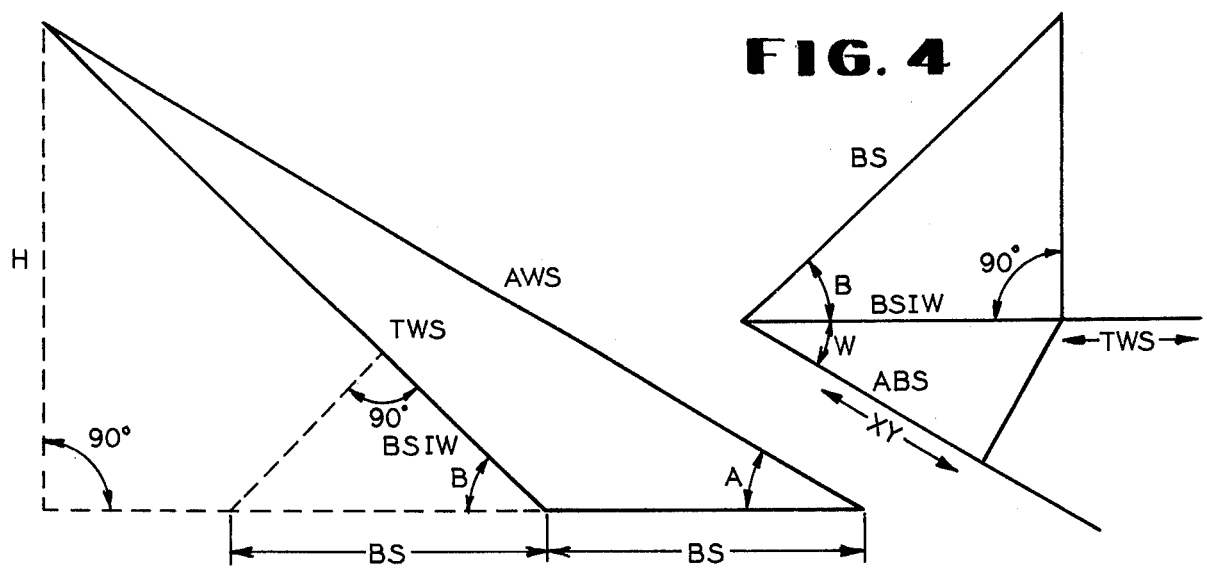
FIG. 4
FIG. 3
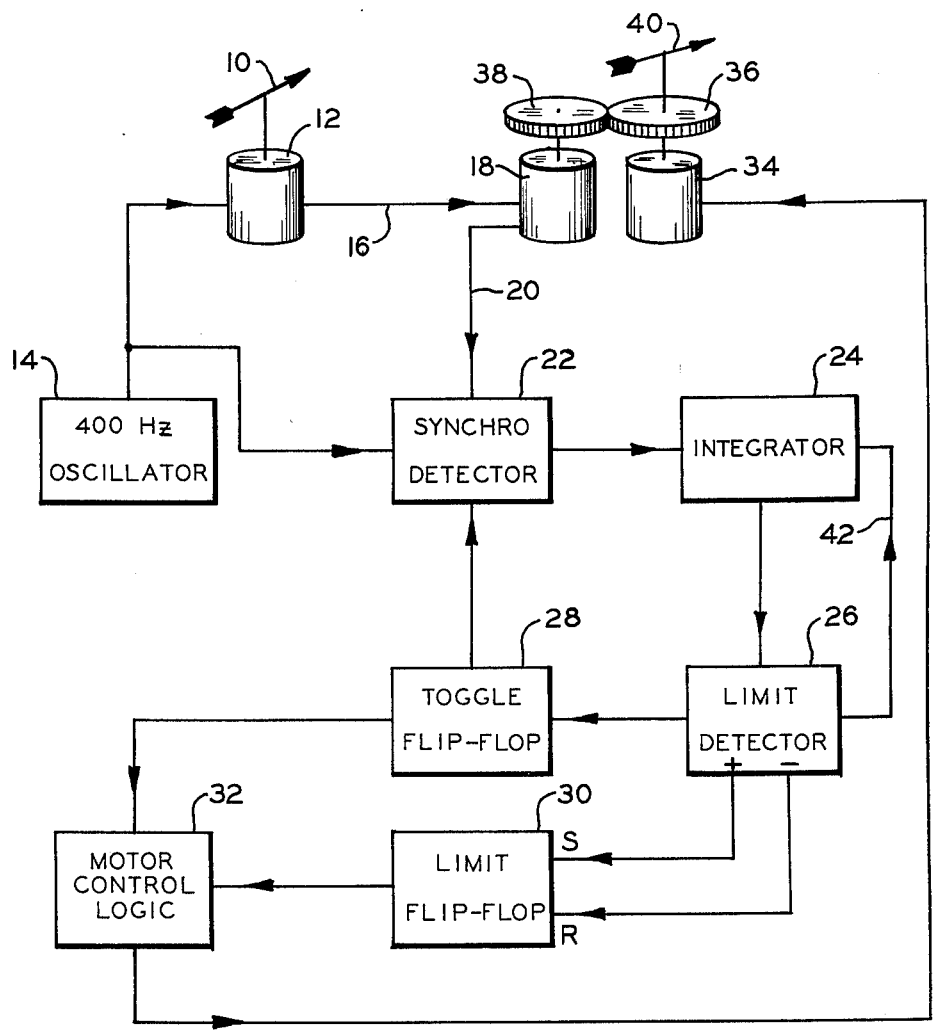
FIG. 5

3,934,129

APPARENT WIND DIRECTION INDICATOR

This is a division, of application Ser. No. 347,380, filed Apr. 3, 1973, and now U.S. Pat. No. 3,881,095.

FIELD OF THE INVENTION

The invention relates to a system for automatically determining performance characteristics of a sailing boat which system includes means for ascertaining and utilizing the average boat speed, average apparent wind speed and average apparent wind direction to thereby enable a sailor to most efficiently sail the boat at the maximum hull speed under continuously varying conditions. The invention relates in particular to an apparent wind direction indicator for generating the average apparent wind direction for use in the system for evaluating the performance of a sail boat.

DESCRIPTION OF THE PRIOR ART

Many attempts have been made toward evaluating the performance of a sailboat in an effort to assure that the sailboat is performing as close to its "hull speed" as possible. It is well understood that sail design, hull design, sea conditions, and wind conditions cooperate in determining the speed of a sailboat. While, as pointed out, the above items determine boat speed, much of this basic information has never been properly checked from an emperical standpoint because there have been no systems employing really meaningful metering equipment. Previous apparent wind direction indicators have generated either the indications of the instantaneous apparent wind direction or of an average apparent wind direction where the average was obtained by integrating the instantaneous apparent wind direction signal.

SUMMARY OF THE INVENTION

It is an object of the present invention to produce a wind direction indicator for generating the average apparent wind direction for use in a system for evaluating the performance of a sailboat capable of ascertaining average boat speed, average apparent wind speed and average apparent wind direction.

Another object of the invention is to produce a wind direction indicator for use in a system for evaluating the performance of a sailboat wherein means are provided to automatically sense average apparent wind direction either individually or in combination with means to automatically sense average boat speed and average apparent wind speed.

A further object of the invention is to produce an average apparent wind direction indicator which may be readily and economically installed as auxiliary equipment on existing boats or may be incorporated as an integral portion of sailboats during construction.

DESCRIPTION OF THE DRAWINGS

FIG. 3 illustrates a trigonometric solution for true wind speed and the angle between true wind direction and boat heading.

FIG. 4 illustrates a trigonometric solution for the boat speed into the wind and apparent boat speed when boat speed and the angle between the true wind direction and boat heading are known.

FIG. 5 is a functional block diagram of the system for indicating the average apparent wind direction.

DESCRIPTION OF THE PREFERRED EMBODIMENT

Figure 1:
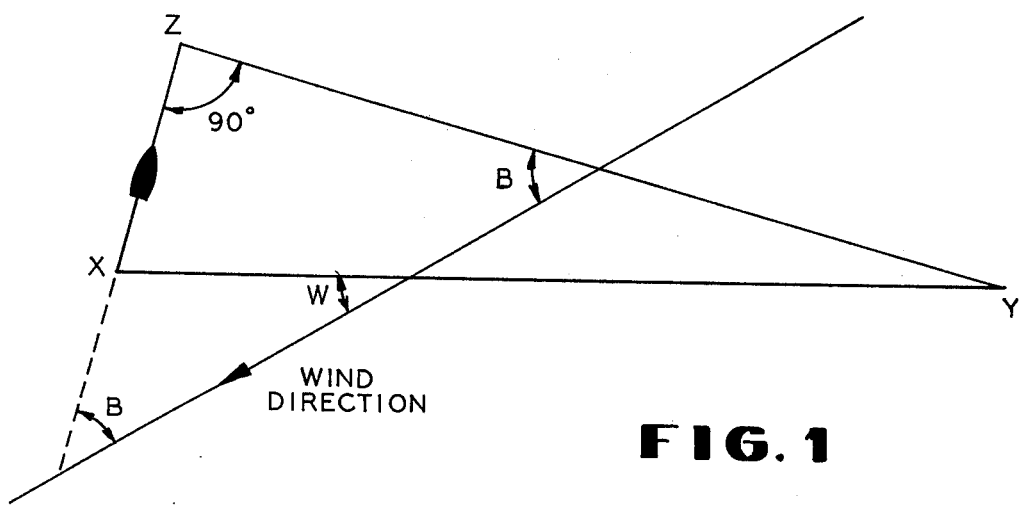
FIG. 1 is a diagram illustrating the course for a sailboat between points X and Y.

In sailboating, the accurate measurements of average apparent wind direction, average apparent wind speed and average boat speed are important whether it is desired to sail from point X to point Y in the shortest possible time or simply to determine if a new piece of equipment has changed the speed of the boat. FIG. 1 is a diagram illustrating a problem in which a sailboat desires to sail from point X to point Y in the shortest possible time. Here the wind is blowing from the general direction of point Y at an angle of W to the desired course XY. The speed of a sailboat into the wind varies with the angle between the boat heading and the direction of the wind, designated as angle B, given a constant wind speed. Therefore by tacking, first sailing a course XZ at an angle to course XY and then sailing course ZY at 90° to the first course, a boat speed may be achieved that will compensate for the increased distance and will result in a shorter elapsed time from mark to mark. If the distance XY and angles B and W are known, then the distance XZ+ZY may be calculated using the well known formulas for a right triangle. The elapsed time is calculated by dividing distance XZY by the average boat speed. A table of boat speed for various wind speeds and angles between wind direction and boat heading may be compiled by testing the boat under actual sailing conditions with the present invention. With this information the course XZY may be plotted before reaching point X, if for example point X is a mark in a race, thus giving an advantage over competitors who must experiment to find the best heading after they reach point X.

Figure 2:
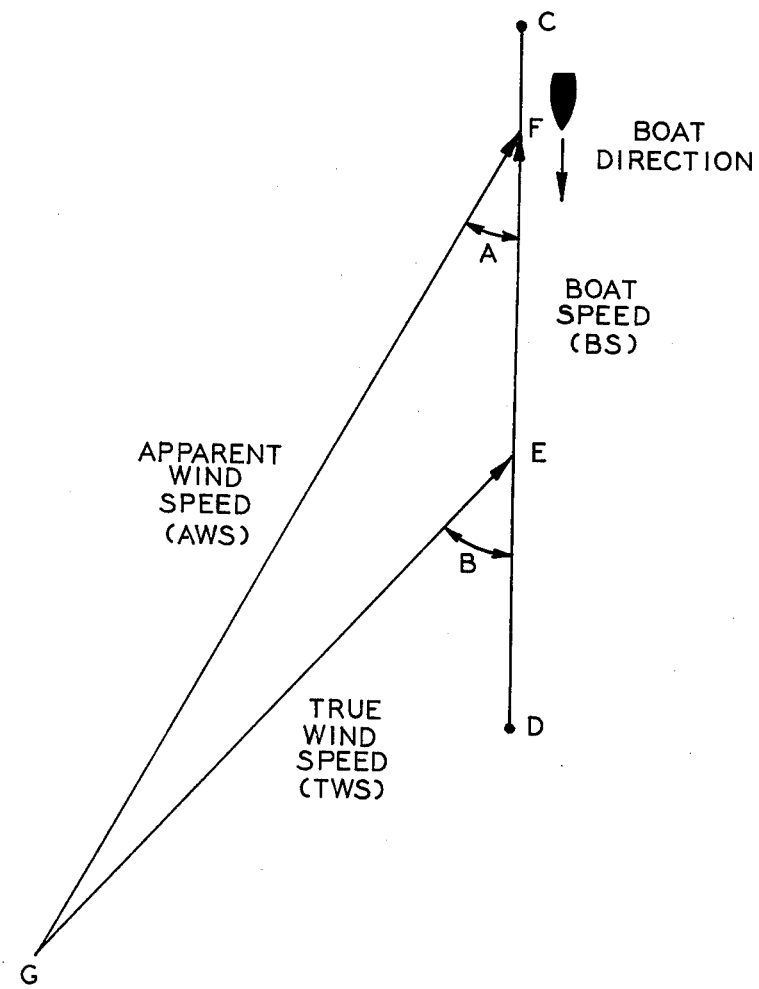
FIG. 2 is a vector diagram showing the relationship between boat speed, apparent wind speed and true wind speed.

The wind direction shown in FIG. 1 is not the wind direction shown by conventional wind indicators. When an object moves through still air, an observer, moving with the object, will experience a wind of speed equal to that of the object and in a direction opposite the direction of movement of the object. Any actual or true wind will be added vectorially to produce an apparent wind direction and speed. FIG. 2 is a vector diagram showing the relationship between boat speed, apparent wind speed and true wind speed. The boat movement is from point C to point D at a speed represented by the length of vector EF. This boat movement creates a wind past the boat of magnitude EF in the direction opposite the boat heading. A true wind of magnitude GE is blowing from the starboard or right side of the boat at an angle B. The addition of vectors EF and GE results in vector GF at angle A which is the apparent wind magnitude and direction as indicated on the boat.

Since conventional instrumentation provides apparent wind direction and speed, the true wind direction and speed must be calculated in order to plot the best course. FIG. 3 illustrates a trigonometric solution for true wind speed TWS and the angle between true wind direction and boat heading. Boat speed BS, apparent wind speed AWS and the angle between the boat heading and apparent wind direction, A, are known. BS, AWS and TWS form an oblique triangle with the angle between boat heading and TWS direction, B, as an exterior angle. TWS may be found from the formula TWS= $\sqrt{(BS)^2+(AWS)^2- \sqrt{2} \ (BS) \ (AWS) \ \cos \ A}$ when two sides and the included angle of a triangle are known. To solve for angle B, side BS is extended to a point where if it joins perpendicular H from the intersection of sides AWS and TWS. In a right triangle H=TWS sin B and R=AWS sin A so sin B=AWS sin A/TWS.

Since sea conditions affect the boat speed, it is advantageous to recheck the projected course XZY after passing point X. The apparent boat speed along course XY is equal to the elapsed time for course XZY divided by distance XY. Therefore, the higher the apparent boat speed along course XY the better the actual course XZY. The apparent boat speed is proportional to a speed in the direction of the wind called boat speed into the wind BSIW. As shown in FIG. 3 BSIW is the vector component of BS along the TWS direction. FIG. 4 illustrates a trigonometric solution for BSIW when BS and angle B are known. BSIW=BS cos B. Now vector BSIW may be broken down into its components, the component in the direction of course XY being apparent boat speed ABS. ABS=BSIW cos W. Therefore, BSIW is proportional to ABS for a constant angle W and is a reliable indicator of the elapsed time.

An accurate indicator of the apparent wind direction is necessary for a calculation of the best course. The boat cannot react to rapid fluctuations in wind speed and direction so it responds instead to an average wind speed and direction. Data obtained from instantaneous readings of the wind direction indicator may vary significantly from the average and thus produce erroneous results. The present invention overcomes this problem by providing an indicator of an average apparent wind direction. FIG. 5 is a functional block diagram of the preferred embodiment for indicating the average apparent wind direction. In this system instantaneous apparent wind direction is compared to the average apparent wind direction and an error signal is generated. The error signal is integrated to produce an average error signal which is utilized to correct the average apparent wind direction indicator. The position of the average apparent wind direction indicator is controlled by a stepper motor. The frequency of motor rotation is proportional to the error magnitude. Thus the system responds in a linear manner producing an indication that is a close approximation to an exponentially weighted average over the time of the input shaft angular position.

A conventional wind direction sensing element 10 is coupled to the input shaft of a synchro transmitter 12. Element 10 rotates the input shaft and rotor of 12 to indicate instantaneous wind direction. Single-phase power is supplied to the rotor of 12 by a 400 Hz oscillator 14. The stator of 12 has three windings which are Y-connected and have output terminals. These terminals are connected by a three wire line 16 to the terminals of similar windings in the stator of synchro receiver 18. The voltage on the rotor induces a voltage across each stator winding of 12. The output voltages between each pair of terminals vary as a sine wave as the input shaft of 12 is rotated and they are out of phase by 120°. If the angular position of the rotor of 18 corresponds with the angular position of the rotor of 12 then the flux patterns produced in the synchros are the same and no voltage will be induced in the rotor winding of 18. However, if the rotor positions are not the same an error voltage is produced on line 20 with a magnitude proportional to the sine of the angular difference between the rotor positions.

The magnitude of the error signal on line 20 is compared to the signal being provided by oscillator 14 in synchro detector 22 and a DC error signal is produced. This error signal is integrated by integrator 24 with a predetermined time constant to produce an average error signal. A limit detector 26 checks the integrator output against a positive and a negative error limit. If either limit is exceeded a signal is sent to toggle flip-flop 28. Each time the toggle flip-flop 28 receives an error limit exceeded signal it signals the synchro detector 22 to change the polarity of its output. This is achieved by reversing the phase of the reference signal from oscillator 14 in the detector 22. Now the integrator output will reverse direction and fall below the limit exceeded.

The positive limit exceeded output of limit detector 26 is connected to the set input of limit flip-flop 30 while the negative limit exceeded output is connected to the reset input. Therefore, flip-flop 30 is set when the positive limit is exceeded and reset when the negative limit is exceeded. The outputs of flip-flop 28 and 30 are compared by motor control logic 32. When the flip-flop outputs are in like states the motor control logic will cause stepper motor 34 to rotate a predetermined increment in one direction and when the flip-flop outputs are in opposite states the stepper motor 34 is rotated in in the other direction. A gear 36 is attached to the shaft of stepper motor 34 and as the motor shaft rotates gear 36 drives a similar gear 38 attached to the shaft of synchro receiver 18. This rotation brings the shaft of synchro receiver 18 closer to the angular position of the shaft of synchro transmitter 12 thus reducing the error signal on line 20. Since the stepper motor 34 rotation is controlled by an average error signal there must be a significant shift in the wind direction to actuate 34. An indicator 40 attached to the shaft of the stepper motor 34 provides an indication of the average wind direction.

If, after the first actuation of stepper motor 34, the error signal on line 20 is still significant the process will be repeated. For example, assume the error signal on line 20 is in phase with the reference signal in the detector 22. This will produce a positive DC error signal from 22 and a positive average error signal from 24. When the average error signal exceeds the positive limit, flip–flop 30 is set and, assuming a set on flip-flop 28 produces a positive polarity from 22, flip-flop 28 is reset. The set from 30 and the reset from 28 cause motor control logic 32 to signal stepper motor 34 to step in a direction to reduce the error. The reset of 28 changes the phase of the reference signal in the detector 22 by 180° to thus changing the error signal from 22 to negative. Integrator 24 changes the average error signal output from positive to negative. If the signal on 20 is still too large the negative error limit will be exceeded which will cause flip-flop 30 to reset and flip-flop 28 to set. The outputs of the flip-flops are still in opposite states and motor 34 will be signalled to again step in a direction to reduce the error. The set of 28 will cause the phase of the reference signal in the detector 22 to again change by 180° which produces a positive DC error signal from 22. The sequence is repeated until the difference in shaft positions produces an error signal on 20 below the accepted limits.

If a change in wind direction should reverse the phase of the error signal on line 20 the DC error signal is also reversed. Assuming the conditions from the last change in the previous example, the reference signal in the detector 22 in phase with the error signal on line 20, flip-flop 28 is set, flip-flop 30 is reset and the error signal on line 20 is below the limit. A change in the wind direction changes the error signal on line 20 by 180° in phase. The DC error signal and the average error signal also become negative. When the negative error limit is reached flip-flop 28 is reset and flip-flop 30 remains reset. The outputs of the flip-flops are the same and the motor 34 is stepped in the opposite direction to correct the negative error signal.

A feedback line 42 is provided between limit detector 26 and integrator 24 to prevent the average error output of the integrator from becoming locked outside the limits. This might occur, for example, when the unit is first turned on. The average error signal could exceed the limit while the polarity of the DC error signal would be the same so as to hold the average error output over the limit. This would prevent the limit detector 26 from activating the flip-flops 28 and 30 and the stepper motor 34 would not be actuated to correct the difference in shaft positions.

Each time a limit is exceeded a signal is sent on line 42 to reduce the magnitude of the average error voltage by a small fraction. Where the limit has just been reached this reduces the voltage below the limit level. Where the limit has been substantially exceeded the reduction will not reduce the average error voltage below the limit level and the limit detector will continue to emit limit exceeded signals on line 42 until the average error voltage is within the limits.

Figure 6:
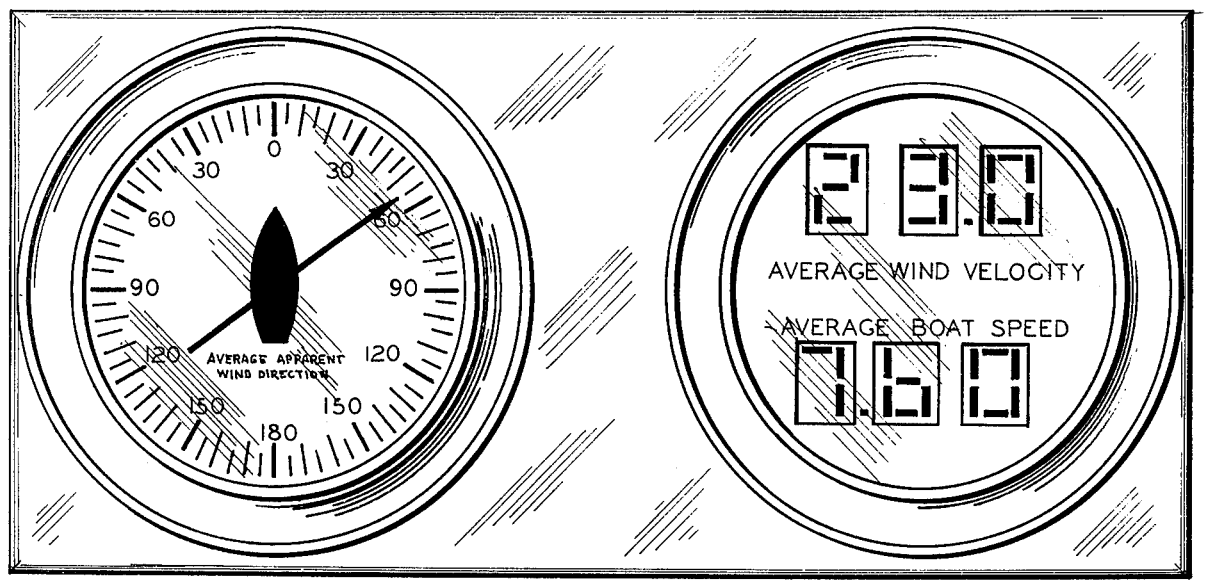
FIG. 6 illustrates one embodiment of the invention in which average apparent wind direction, average wind velocity and average boat speed are available for visual inspection.
Figure 7:
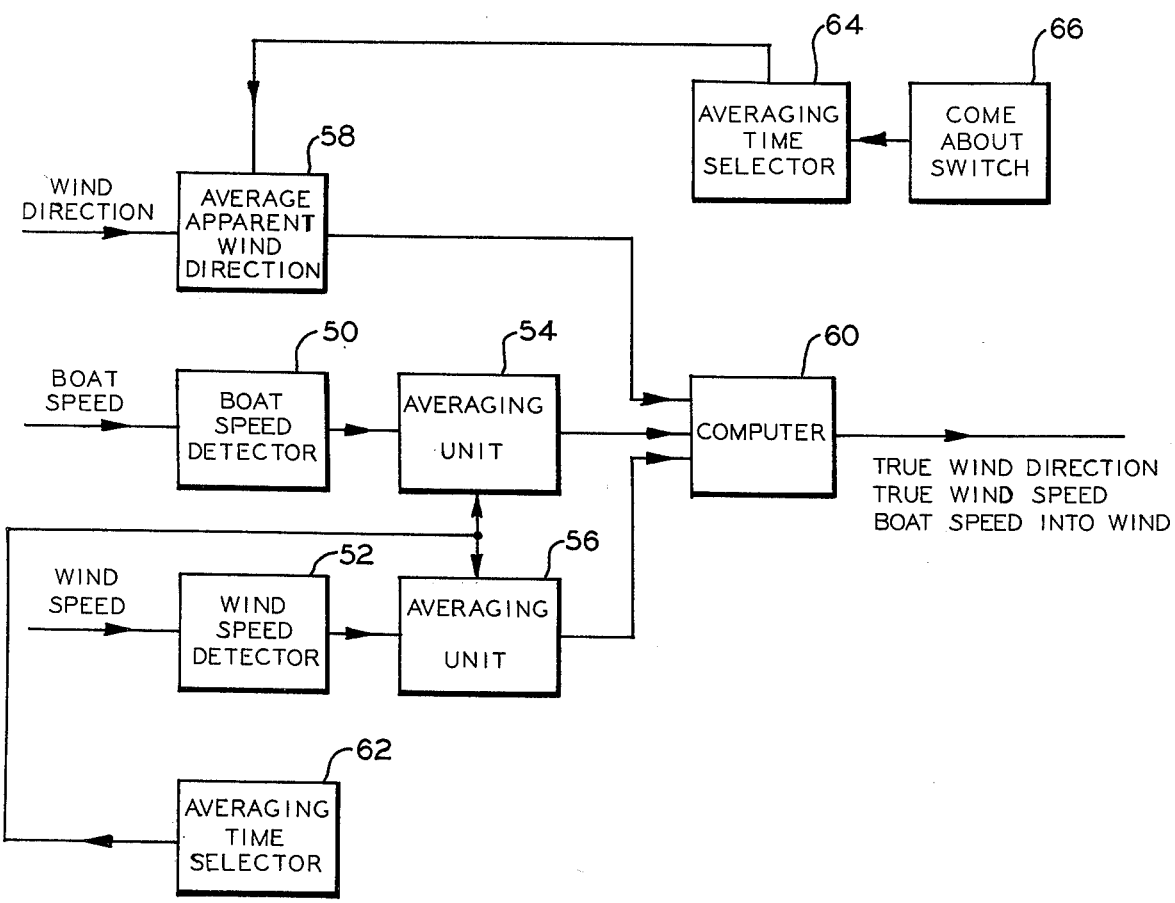
FIG. 7 is a functional block diagram of the system for ascertaining average apparent wind direction, average boat speed and average wind speed and utilizing them to automatically produce true wind direction, true wind speed and boat speed into the wind.

As utilized on a sailboat the present invention provides an indication of average apparent wind direction over a period of time governed by the time constant of the integrator. FIG. 6 illustrates one embodiment of the invention in which the average apparent wind direction is available for visual inspection. By including detectors and readouts for average wind velocity and average boat speed all the information is available for calculating true wind speed and direction with which to plot the best course. The average apparent wind direction, average wind velocity and average boat speed signals might also be connected as inputs to a small shipboard computer programmed to provide true wind speed and direction and boat speed into the wind as shown in FIG. 7. Boat speed detector 50 and wind speed detector 52 may be conventional units of known construction. The outputs of 50 and 52 are read by averaging units 54 and 56 which produce average boat speed and average wind speed signals. Average apparent wind direction signals are provided by unit 58 which may be of the type shown in the preferred embodiment of FIG. 5. The average apparent wind direction signal from 58, the average boat speed signal from 54 and the average wind speed from 56 are the inputs to computer 60 which may be a small general purpose unit of the type commonly referred to as "mini-computers". The computer provides output signals representing true wind direction, true wind speed and boat speed into the wind with which to evaluate the sailboat performance.

An averaging time selector 62 may be provided to change the averaging time period to correspond with the reaction time of the boat. A boat having a slower reaction time would utilize a long averaging period. If for example, the outputs from boat speed detector 50 and wind speed detector 52 are pulse trains with the pulse generation rate proportional to the magnitude of the input, then units 54 and 56 would have a predetermined signal read period for counting the number of pulses supplied. An average number of counts per signal read period would then be calculated from all the read periods contained in an averaging period variable between several seconds and several minutes. The average number of counts per signal read period is then proportional to the average magnitude of the boat speed and wind direction during the averaging period. Averaging units 54 and 56 may also produce an update signal which represents the average of all preceding read periods during an averaging period. If the update signal is produced after each read period, the last update signal during an averaging period would be the average of all read periods contained in that averaging period. If it is desired that each averaging period contain the same number of read periods, the duration of the read periods would be varied as the duration of the averaging period changed. For example, where eight read periods are involved, averaging period durations of 15, 60 and 120 seconds would result in read period durations of 1.875, 7.5 and 15 seconds respectively. The averaging time selector 62 may be provided with an adjustable control for manual selection among several averaging period durations.

Integrator 24 of average apparent wind direction unit 58 has a predetermined time constant which determines the time delay between the occurrence of a significant change in wind direction and the moment the error limit is exceeded. Since the polarity of the input to the integrator is reversed each time a limit is exceeded, the integrator time constant also determines the frequency at which stepper motor 34 is stepped for a given difference in position between instantaneous wind direction and average apparent wind direction. As with the above-mentioned averaging units 54 and 56, the average apparent wind direction unit may be provided with an averaging time selector 64. Selector 64 changes the integrator time constant to compensate for the reaction time of the sailboat. Therefore, a long time constant will smooth out rapid fluctuations in wind direction and provide an average direction to which the sailboat is responding. If the averaging time selector 64 is set for a long time constant and it is desired to make a substantial change in the heading of the boat, the unit 58 will not be able to produce an accurate output signal for a relatively long period of time. To solve this problem, come about switch 66 is provided to set averaging time selector 64 for the smallest time constant available. After the heading change, averaging time selector 64 is then reset to the previously selected time constant.

The system as described herein provides a sailor with an accurate measurement of the performance of his boat under all types of conditions. The accuracy of the information is such that a small change in apparent wind direction, that may provide an extra one tenth of a knot in boat speed, may be detected and utilized to win a close race.

In accordance with the provisions of the patent statutes, we have explained the principle and mode of operation of our invention and have illustrated and described what we now consider to represent its best embodiment. However, we desire to have it understood that the invention may be practiced otherwise than as specifically illustrated and described without departing from its spirit or scope.

We claim:

1. An apparatus for indicating the average apparent wind direction, comprising:
   a source for generating a signal representing instantaneous apparent wind direction;
   a source of a reference signal;
   means responsive to said instantaneous apparent wind direction signal, said reference signal and an average apparent wind direction indication for producing an average error signal; and
   means responsive to said average error signal for indicating the average apparent wind direction.

2. An apparatus according to claim 1 wherein said signal source representing instantaneous apparent wind direction includes a wind detector responsive to the instantaneous apparent wind and coupled to the input shaft of a synchro transmitter, said synchro transmitter being responsive to the position of said wind detector for generating said instantaneous apparent wind direction signal.

3. An apparatus according to claim 1 wherein said means for producing an average error signal includes means for comparing said instantaneous apparent wind direction signal to said average apparent wind direction indication to produce a first error signal; means for comparing said first error signal to said reference signal to produce a second error signal; and means responsive to said second error signal for producing a time-weighted average of said second error signal for said average error signal.

4. An apparatus according to claim 3 wherein said means for producing a first error signal is a synchro receiver responsive to said instantaneous apparent wind direction signal and the position of said means for indicating the average apparent wind direction.

5. An apparatus according to claim 3 wherein said source of a reference signal is a 400 Hz single-phase oscillator.

6. An apparatus according to claim 3 wherein said means for producing a second error signal is a synchro detector.

7. An apparatus according to claim 3 wherein said means for producing an average error signal is an integrator.

8. An apparatus according to claim 3 wherein said means for indicating average apparent wind direction includes means for generating an error limit exceeded signal when said average error signal exceeds a predetermined limit and for generating a set signal in response to an average error signal of one polarity and a reset signal in response to an average error signal of the other polarity; means responsive to said error limit exceeded signal for reversing the phase of said reference signal; means responsive to said set and reset signals for indicating the polarity of said average error signal; control means responsive to the phase of said reference signal and the polarity of said average error signal for producing a direction signal; and means responsive to said direction signal for rotating said means for indicating the average apparent wind direction to reduce said first error signal.

9. An apparatus according to claim 8 wherein said means for generating said error limit exceeded signal and said set and reset signals includes means for generating a limit exceeded signal when said average error signal exceeds said predetermined limit and wherein said means for producing said average error signal is responsive to said limit exceeded signal for reducing the magnitude of said average error signal below said predetermined limit.

10. An apparatus according to claim 8 wherein said means for reversing the phase of said reference signal is a toggle flip-flop having two separate output states which alternate in response to said error limit exceeded signal.

11. An apparatus according to claim 10 wherein said means for indicating the polarity of said average error signal is a limit flip-flop having two separate output states corresponding to the output states of said toggle flip-flop and representing positive and negative average error signals.

12. An apparatus according to claim 11 wherein said control means produces a first direction signal when the output states of said toggle flip-flop and said limit flip-flop are alike and a second direction signal when said output states are opposite.

13. An apparatus according to claim 12 wherein said means for rotating said means for indicating the average apparent wind direction includes a stepper motor in geared relation with said means for producing a first error signal, such that an increment of rotation of a shaft of said stepper motor produces the same increment of rotation of a shaft of said means for indicating the average apparent wind direction, said stepper motor being responsive to said first and second direction signals to rotate said increment in a direction to reduce the magnitude of said average error signal; and wherein said means for indicating average apparent wind direction includes a wind direction indicator coupled to said stepper motor shaft.

14. An apparatus according to claim 3 wherein said signal source representing instantaneous apparent wind direction includes a wind detector responsive to the instantaneous apparent wind and coupled to the input shaft of a synchro transmitter, said synchro transmitter being responsive to said reference signal and the position of said wind detector for generating said instantaneous apparent wind direction signal, and wherein said means for producing a first error signal is a synchro receiver responsive to said instantaneous apparent wind direction signal and the position of said means for indicating the average apparent wind direction; said source of a reference signal is a 400Hz single-phase oscillator; said means for producing a second error signal is a synchro detector which compares said 400Hz single-phase reference signal to said first error signal; and said means for producing a time-weighted average of said second error signal is an integrator responsive to said second error signal.

* * * * *